United States Patent [19]

Haraden et al.

[11] Patent Number: 5,082,356
[45] Date of Patent: Jan. 21, 1992

[54] TEMPERATURE CONTROL APPARATUS FOR CONTROLLING METALLIC VAPOR PRESSURE IN A CLOSED CELL

[75] Inventors: Thomas Haraden, Ipswich; Harold L. Hough, Beverly; Philip Moskowitz, Georgetown, all of Mass.

[73] Assignee: GTE Products Corporation, Danvers, Mass.

[21] Appl. No.: 470,278

[22] Filed: Jan. 25, 1990

[51] Int. Cl.⁵ .................................................. G02B 5/00
[52] U.S. Cl. .................................... 359/886; 250/436; 250/343; 250/352; 250/429; 356/43; 359/896
[58] Field of Search ............... 350/321, 311, 319, 314, 350/1.1, 1.5; 250/429, 352, 343, 493.1, 495.1, 436; 364/557; 356/43

[56] References Cited

U.S. PATENT DOCUMENTS

| 4,452,538 | 6/1984 | Reger et al. | 356/43 |
| 4,749,276 | 6/1988 | Bragg et al. | 250/343 |
| 4,789,784 | 12/1988 | Grossman | 250/436 |
| 4,935,633 | 6/1990 | Curbelo et al. | 250/493.1 |

Primary Examiner—Loha Ben
Attorney, Agent, or Firm—Joseph S. Romanow

[57] ABSTRACT

By controlling the temperature of a glass reservoir tube attached to a closed vapor cell, the vapor pressure inside the cell can be accurately controlled. The apparatus for controlling the reservoir temperature includes an electric heater, a temperature sensor, heat straps to distribute and remove heat from the reservoir, and a clamp to hold the apparatus in close thermal contact with the exterior of the reservoir. An external control circuit energizes the reservoir heater as required. In the preferred embodiment the vapor cell functions as an optical filter when filled with a heated metallic vapor such as cesium. The reservoir tube functions as the cold spot of the cell and contains a small pool of the metal in liquid form.

14 Claims, 2 Drawing Sheets

TEMPERATURE CONTROL APPARATUS FOR CONTROLLING METALLIC VAPOR PRESSURE IN A CLOSED CELL

This invention was made with Government support under N66001-86-R-0050 awarded by the Department of the Navy. The Government has certain rights in this invention.

BACKGROUND OF THE INVENTION

1. Field of the Invention

The present invention relates to the field of atomic spectroscopy, and more particularly to a unique temperature controller for sensing and regulating the evaporation and condensation rate of a metallic liquid inside a closed vapor cell comprising an atomic optical filter.

2. Description of the Prior Art

Closed vapor cells filled with metallic vapor at a particular pressure exhibit sharply defined line spectra when excited by external stimuli such as an electrical current or light from a suitable source. This principle is used in the lighting field for sodium and mercury vapor lamps. Vapor cells are also used for atomic spectroscopy, and more particularly in resonant laser absorption spectroscopy. However, such applications require tightly controlled pressures and temperatures for predictable and repeatable results. To maintain the internal vapor pressure at a predetermined fixed level, a reservoir, called a "cold spot" containing a metal alkali in a liquid state, is used. At some localized point within or near the main chamber of the vapor cell, this open reservoir is held at a constant temperature less than that of the cell itself hence the name "cold spot"). The reservoir maintains a constant gas pressure of the metallic vapor inside the cell and provides a condensation point that constant at a value below the temperature of the cell so as to provide the desired "cold spot" for the cell.

BRIEF DESCRIPTION OF THE DRAWINGS

For a better understanding of the invention as well as other objects and further features thereof, reference is made to the following description which is to be read in conjunction with the accompanying drawings wherein.

DETAILED DESCRIPTION OF THE INVENTION

Figure 1:
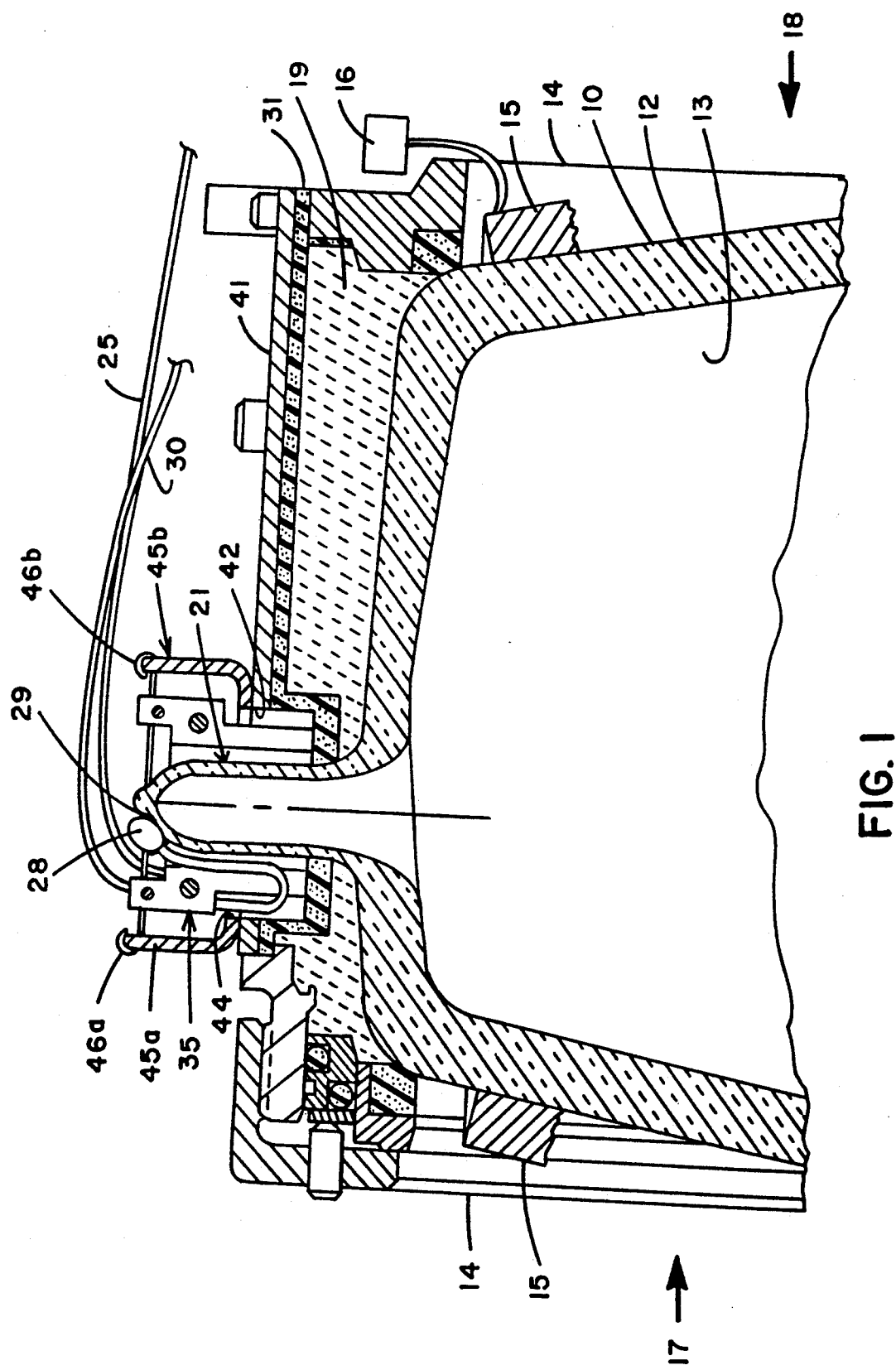
FIG. 1 is an enlarged transverse section of an end portion of a vapor cell embodying this invention, the section being taken on line 1—1 of FIG. 2.

For a better understanding of the subject invention, reference is made to the following description and appended claims in conjunction with the above-described drawings. FIG. 1 depicts a cross section of vapor cell 10 showing only the upper end portion, as viewed. Vapor cell 10 is an annular closed cell having a preferably glass wall 12 enclosing an interior space or chamber 13. A metal frame 14 enclosing the periphery portion of cell 10 provides structural support for it. In practice, cell 10 contains a metal vapor, such as cesium vapor, which interacts with the output from a laser (not shown) passing from frame aperture 17 through cell chamber 13 to produce the desired spectra passing out through frame aperture 18. A heating element 15 attached to the exterior of cell wall 12 connects to a suitable power source, also not shown, through a temperature control circuit 16 and maintains the temperature within cell 10 at a constant predetermined desired level for sustaining vaporization of the cesium the celsium therein. In order to prevent the unintended escape of optical radiation from cell 10, as explained below, a layer 19 of reflective powder, such as barium sulfate, is packed around the outer circumference of cell 10 and within frame 14. A silicone rubber gasket 31 prevents this powder from escaping. Plate 41 holds gasket 31 in place while providing a means for mounting a U-shaped cover 45 further details of which are described below.

Figure 3:
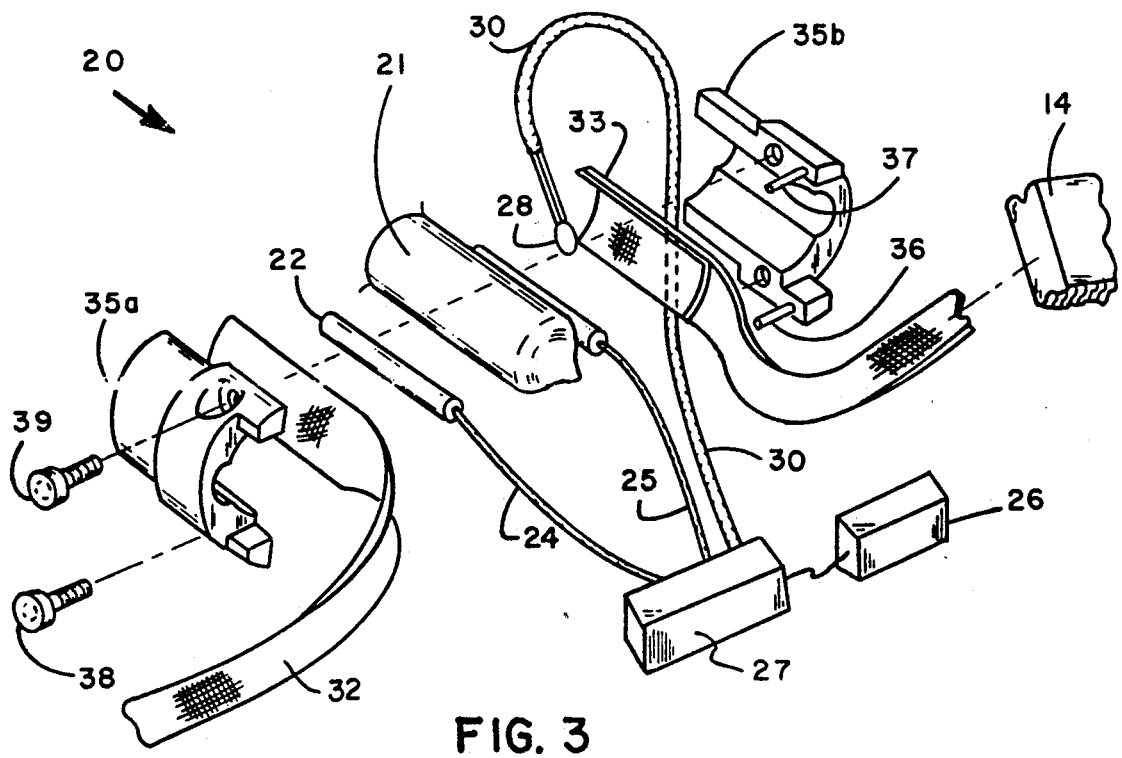
FIG. 3 is a partially schematic exploded perspective view of the reservoir only together with associated temperature control components.

In accordance with this invention, apparatus 20 as shown in FIG. 3 is provided to maintain a metallic vapor in a gaseous state within cell 10 and to prevent condensation thereof on the inside surface of cell wall 12. Apparatus 20 comprises a tubular reservoir 21 which is integrally connected to and extends upwardly, as viewed in FIG. 1, from cell 10. In practice, reservoir 21 is part of the glass exhaust tubing fused to an opening in the glass wall of cell 10 and provides initial access to chamber 13. The tubing is subsequently cut and heat-sealed to form a hollow closed tip that opens into the interior of cell 10. Thus the interior of reservoir 21 is integral with and has a volume substantially less than that of cell 10.

Prior to sealing reservoir 21, cell 10 is purged and supplied with a charge of a pure liquid metal such as cesium. After reservoir 21 is sealed, cell 10 is heated by element 15 to about 200° C. This converts all of the liquid cesium in cell 10 to a gas while some of the cesium gas condenses in reservoir 21 to form a pool of liquid. In order to prevent condensation of the cesium within cell 10, the temperature of reservoir 21 is maintained at a constant value below the temperature in cell 10. Thermal conduction and radiation effects from cell 10 passively heat reservoir 21 to about 70° C. The desired optical filtering requirements of cell 10 dictate that the optimum temperature of reservoir 21 be between 75° C. and 105° C. so that auxiliary heating of reservoir 21 is necessary. Such heating is provided preferably by two resistive heater cartridges 22 and 23, shown in FIGS. 2 and 3, which are in intimate contact with the exterior surface of reservoir 21. Cartridges 22 and 23 are electrically connected, via leads 24 and 25, respectively, to a remote power source 26, shown in FIG. 3, through a suitable electronic controller 27. In order to precisely control the temperature of reservoir 21, a precision temperature sensor 28 such as a thermistor, is attached to the exterior of reservoir 21, preferably with a thermally conductive epoxy 29. Sensor 28 is also electrically connected to an independent port of electronic controller 27 via a pair of insulated leads 30.

Referring to FIG. 3, it is a feature of this invention that cooling means are provided to continuously remove heat from reservoir 21 in the event of a change in cell temperature, a change in ambient or other possible temperature changes requiring a cooling of the reservoir. Such heat removal or cooling is preferably provided by a pair of flat braided copper straps 32 and 33 which are wrapped around reservoir 21 and over heaters 22 and 23, respectively, and which extend outwardly therefrom for connection to a canister (not shown) serving as a heat sink. Because bare copper braids 32 and 33 encompass both the reservoir and the cartridge heaters, any heat generated by heaters 22 and 23 is advantageously distributed by the braids to the reservoir glass for more uniform heating. In the preferred embodiment, each braid is normally 0.56" wide and 0.03" thick, except that the end portion covering the reservoir is folded over during assembly thereof to provide twice the thickness.

A clamp 35 comprising mating half-shell parts 35a and 35b holds cartridges 22 and 23 and straps 32 and 33 in close thermal contact with each other and with reservoir 21. Clamp 35 has alignment pins 36 and 37 on part 35b which mate with corresponding holes, not shown, in part 35a and together with screws 38 and 39 act as a fulcrum to apply a strong clamping force against the enclosed components and reservoir 21 to properly orient these parts in the clamped position. Clamp 35 is preferably made of brass to aid in distributing heat generated by heaters 22 and 23.

Figure 2:
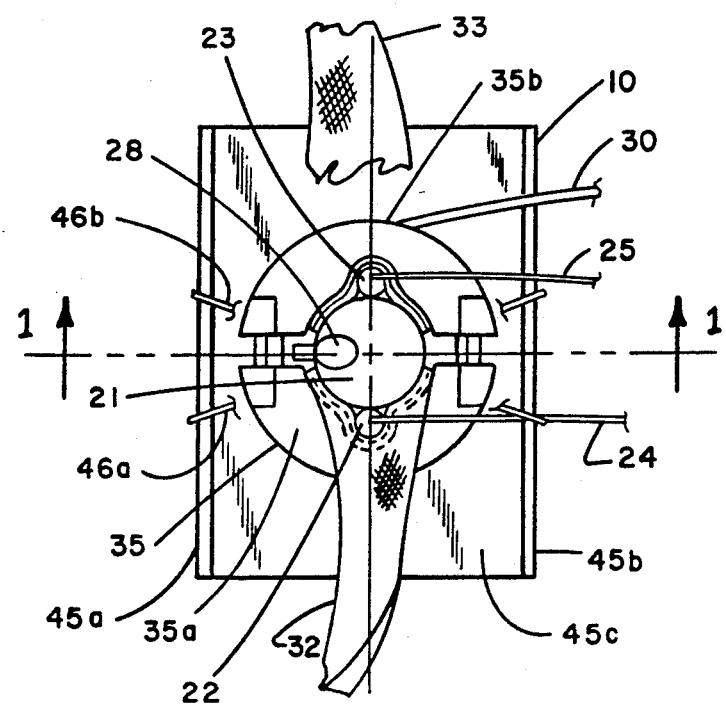
FIG. 2 is an end view of part of the vapor cell showing the "cold spot" reservoir and the temperature control components connected thereto.

Referring to FIGS. 1 and 2, in order to protect reservoir 21 from damage, a plate 41 is secured to the top of frame 14 and has an opening 42 through which much of reservoir apparatus 20 extends. U-shaped cover 45 with an opening 44 coincident with opening 42 in plate 41 is secured to the latter. Cover 45 has a bottom portion 45c and has upwardly projecting walls 45a and 45b which form a protective barrier around reservoir 21. Keeper wire 46 having end portions 46a and 46b is secured to and extends across the upper end of wall 45a to 45b to prevent the temperature control components from sliding off reservoir 21.

In operation, heaters 15 around the exterior of cell 10 maintain the temperature within the cell at about 200° C. so as to maintain the cesium in a vaporized state. In order to insure that vapor pressure in cell 10 is maintained at a fixed level, reservoir 21 is held at a constant temperature. e.g., between 70° C. and 105° C., less than the temperature within cell 10 by heaters 22 and 23 through controller 27 and in conjunction with heat removal straps 32 and 33. Sensor 2B precisely detects the existing temperature in reservoir 21 to within approximately 0.1° C. and feeds this back to controller 27 to achieve the desired result. Reservoir 21 is thus maintained as the "cold spot" in the metal vapor system and insures that any condensation of the metal vapor will occur in reservoir 21 and not in cell 10.

As mentioned above, precision temperature control at apparatus 20 is necessary for achieving successful operation of the optical filter of which vapor cell 10 is a part, such as converting incoming blue photons at 455 nm or 459 nm to red photons at 852 nm and 854 nm. This quantitative measure of filter effectiveness is the optical bandwidth of the cell. Successful operation is in part achieved by maintaining the filter optical bandwidth, nominally at 459 to predetermined levels. In one application in order to function reliably, the filter has to maintain this bandtion width for a range of outside ambient temperatures of 0 to 25° C. Actual laser absorption tests performed on a cell with apparatus 20 embodying the invention verified the reliability of this temperature control apparatus for two different reservoir temperature settings of 85° C. and 95° C. The data listed below shows the measured optical bandwidth for ambient temperatures of 0° and 25° C. with the foregoing two reservoir temperatures. The bandwidths of 15 to 27 mA at 459 nm were within the desired operating specifications established as the objective.

| Test #: | Cesium Cell Measured Performance | | | |
| --- | --- | --- | --- | --- |
|  | 1 | 2 | 3 | 4 |
| Ambient temp (in °C.): | 25 | 25 | 0 | 0 |
| Cold spot temp (in °C.): | 85 | 95 | 85 | 95 |
| Cold spot heater (in watts): | 1.4 | 2.6 | 4.6 | 5.6 |
| Optical bandwidth (in mÅ): | 15 | 24 | 24 | 27 |

While the invention has been described with reference to its preferred embodiments, it will be understood by those skilled in the art that various changes may be made and equivalents may be substituted for elements thereof without departing from the true spirit and scope of the invention. For example although heaters 22 and 23 are shown as cylindrical cartridges, there is no reason other forms of electrical heating could not be used, such as electrical resistance wire wrapped around portions of the reservoir 21. In addition, many modifications may be made to adapt a particular situation or material to the teaching of the invention without departing from its essential teachings.

What is claimed is:

1. Temperature control apparatus for maintaining metallic vapor at a constant pressure within the interior of a hollow closed cell comprising:
   a hollow reservoir external to said cell and having an interior connected to the interior of said cell, the volume of said reservoir interior being substantially smaller than the interior volume of said cell;
   means to heat the interior of said cell to a temperature $T_1$;
   a temperature sensor attached to the exterior of said reservoir;
   heater means engaging the exterior of said reservoir for heating the interior of said reservoir to a temperature $T_2$ less than $T_1$;
   conductive heat removal means engaging at least a portion of the exterior of said reservoir and said heater means; and
   a temperature controller operatively connected to said sensor and to said reservoir heater means for energizing said reservoir heater means and maintaining said temperature $T_2$ substantially constant.

2. Apparatus according to claim 1, in which said heat removal means comprises a metallic braided strap having one end engaging the exterior of said reservoir, and a heat sink connected to the end of said strap opposite said one end thereof.

3. Apparatus according to claim 1, in which said cell has glass walls, said reservoir comprising a glass tube integrally connected to a wall of said cell and projecting outwardly therefrom.

4. Apparatus according to claim 3, with clamp means on the exterior of said reservoir, said strap and said reservoir heater means being disposed between said clamp means and said reservoir and being held against the latter by said clamp means.

5. Apparatus according to claim 4, with a mounting frame connected to the exterior of said cell, said frame having an opening through which said reservoir extends, an insulating barrier between said frame and said reservoir adjacent said reservoir, said clamp means and said sensor and said reservoir heater means and said strap being disposed on the side of said barrier opposite from said cell.

6. Apparatus according to claim 5, in which said barrier comprises barium sulfate powder.

7. Temperature control apparatus for maintaining metallic vapor at a constant pressure within a closed hollow cell, comprising:

first heater means for heating the interior of said cell to a temperature $T_1$;

a hollow reservoir having an interior connected to the interior of said cell; and control means for precisely maintaining an interior temperature $T_2$ of said reservoir at a predetermined value less than $T_1$, said control means comprising:

second heater means engaging the exterior of said reservoir for heating same;

temperature sensor means affixed to the exterior of said reservoir for sensing the temperature thereof;

a heat sink exterior to said reservoir and said cell;

heat conducting means engaging the exterior of said reservoir and said second heater means for distributing heat generated by said second heater means to exterior areas of said reservoir not engaged by said second heater means, said heat conducting means also engaging said heat sink for transferring thereto heat from said reservoir;

clamp means exterior of said reservoir, for holding said heat conducting means and said second heater means against the exterior of said reservoir; and, energizing means responsive to said sensor means and operatively connected to said second heater means for supplying an energizing current to said second heater means for maintaining the temperature $T_2$.

8. Apparatus according to claim 7, in which said cell has glass walls to provide an optical aperture, and said reservoir comprising a glass tube integrally connected to a wall of said cell and projecting outwardly therefrom.

9. Apparatus according to claim 8, in which said heat conducting means further comprises a bare copper braid wrapped around said second heater means and said cell.

10. Apparatus according to claim 9, in which said temperature sensor means further comprises a thermistor device.

11. Apparatus according to claim 10, in which said clamp means further comprises:

first and second heat-conducting members each having shaped to snuggly engage said copper braid wrapped around said second heater means and said reservoir; and, means for permanently securing said first and second heat-conducting members to each other.

12. Apparatus according to claim 11, in which said thermistor device is affixed to said reservoir with a heat conductive epoxy glue.

13. Apparatus according to claim 12, in which said second heater means further comprises:

first and second cartridge heater disposed on opposite sides of said reservoir.

14. Apparatus according to claim 13, in which said heat conducting means further comprises a pair of bare copper braided straps wherein each is wrapped around one of said cartridge heater means an a portion of said reservoir.

* * * * *